United States Patent
Tanaka et al.

[11] Patent Number: 6,142,556
[45] Date of Patent: *Nov. 7, 2000

[54] WIRING STRUCTURE IN VEHICLE

[75] Inventors: Atsuo Tanaka; Hiroshi Hasegawa, both of Nagoya, Japan

[73] Assignees: Harness System Technologies Research, Ltd., Nagoya; Sumitomo Wiring Systems, Ltd., Mie; Sumitomo Electric Industries, Ltd., Osaka, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/917,812

[22] Filed: Aug. 27, 1997

[30] Foreign Application Priority Data

Aug. 30, 1996 [JP] Japan ................... 8-229937

[51] Int. Cl.⁷ ......................................... B60J 5/00
[52] U.S. Cl. .................. 296/146.7; 296/39.1; 439/34; 174/72 A
[58] Field of Search ............... 296/146.7, 39.1, 296/191, 208; 439/34; 174/72 A

[56] References Cited

U.S. PATENT DOCUMENTS

| | | | |
|---|---|---|---|
| 4,210,773 | 7/1980 | Haley et al. ........................ | 174/72 A |
| 4,815,984 | 3/1989 | Sugiyama et al. ................ | 174/72 A X |
| 4,818,236 | 4/1989 | Nakayama et al. . | |
| 4,824,164 | 4/1989 | Nakayama et al. ................ | 296/146.7 |
| 4,848,829 | 7/1989 | Kidd . | |
| 4,874,908 | 10/1989 | Johansson .......................... | 174/72 A |
| 4,943,241 | 7/1990 | Watanabe et al. ................. | 174/72 A X |
| 5,460,530 | 10/1995 | Toba et al. ......................... | 439/34 X |
| 5,595,415 | 1/1997 | Beaulat .............................. | 296/39.1 |
| 5,743,010 | 4/1998 | Zguskin et al. ................... | 439/34 X |
| 5,811,732 | 9/1998 | Beam ................................. | 174/72 A |
| 5,856,908 | 1/1999 | Takiguchi et al. ................ | 174/72 A X |
| 5,902,007 | 5/1999 | Koester et al. .................... | 296/208 |
| 5,931,682 | 8/1999 | Takiguchi et al. ................ | 174/72 A X |

FOREIGN PATENT DOCUMENTS

| | | | |
|---|---|---|---|
| 534 659 | 3/1993 | European Pat. Off. . | |
| 3502056 | 7/1986 | Germany .......................... | 296/146.7 |
| 36 09 704 | 9/1987 | Germany . | |
| 38 04 086 | 8/1988 | Germany . | |
| 405032127 | 2/1993 | Japan ................................. | 296/146.7 |
| WO 92/05011 | 4/1992 | WIPO . | |

*Primary Examiner*—Joseph D. Pape
*Assistant Examiner*—Jason Morrow
*Attorney, Agent, or Firm*—Oliff & Berridge, PLC

[57] ABSTRACT

A wire harness 32 for those electrical components is laid on the door trim 14. A recess 34 forming a wire laying path for the wire harness is formed in the mounting surface 13 of the door trim 14 through which the door trim 14 is mounted on the door panel 12, and the wire harness 32 is fixedly set in the recess 34 thus formed. Under this condition, a waterproof cushion member 36 is bonded to the whole mounting surface 13 of the door trim 14, to cover the wire harness 32.

10 Claims, 2 Drawing Sheets

WIRING STRUCTURE IN VEHICLE

BACKGROUND OF THE INVENTION

This invention relates to a wiring structure in a vehicle concerning a wire harness connected to electrical components, and a wire harness for connecting with other wire harnesses.

Heretofore, in a vehicle, a wire harness connected to electrical components are inserted into hollows formed in the body panel of the vehicle, or interposed between the body panel and a trim coupled to the body panel.

For instance, in the case where electrical components such as an electric door mirror, a door lock device, and the loudspeaker are mounted on a front door of the vehicle, a wire harness for those electrical components is fixed on the door panel surface (on the side of the vehicle room) with fixing members such as clamps, and are then connected to the terminals of the electrical components. With the wire harness covered with water-proof sheet, the door trim is coupled to the door panel so that the wire harness is arranged between the door panel and the door trims.

The above-described wiring structure suffers from a difficulty that the wire harness assembling work is low in efficiency, and the wire harnesses may be bitten. In order to overcome this difficulty, recently a wiring structure has been proposed in which wire harness is provided integral with an interior material such as a door trim. With this wiring structure, when the interior material is mounted on the door panel, the wire harness is mounted on the door panel together with the door trim.

However, in the wiring structure, a wire harness is merely bonded onto the surface of an interior material. Hence, a protrusion produced by a welding operation may contact with the wire harness to break wires of the wire harness. In addition, because of the difference of the thermal expansion coefficient between the interior material and the wire harness mounted thereon, the wire harness may be broken.

SUMMARY OF THE INVENTION

An object of this invention is to eliminate the above-described difficulties accompanying a conventional wiring structure in a vehicle. More specifically, an object of the invention is to provide a wiring structure for a vehicle in which a wire harness is provided integral with an interior material in the vehicle, in which the breakage of the wire harness is effectively prevented.

The foregoing object of the invention has been achieved by the provision of a wiring structure in a vehicle in which a wire harness for wiring electrical components is set in an interior material, and the interior material is combined with a body panel to arrange the wire harness in the vehicle; in that, according to the invention, the wire harness is fixedly attached on a mounting surface of the interior material through which the interior material is combined with the body panel, and a resilient protective member is laid on the wire harness.

In the wiring structure of the present invention, since the protective member is interposed between the wire harness and the body panel, the wire harness will never be brought into contact with the body panel. Therefore, the difficulty is effectively eliminated that the contact of the wire harness with the body panel breaks the wire harness.

Further, according to the present invention, the recess is formed in the mounting surface of the interior material in such a manner that the recess is extended along a wiring route, and the wiring harness is fixedly set in the recess thus formed.

In the wiring structure of the present invention, since the wire harness is buried in the interior material, the wire harness is spaced away from the body panel surface as much as possible. Therefore, this wire structure prevents the wire harness from being broken by the contact of the wire harness with the body panel.

Furthermore, according to the present invention, the wire harness is in the form of a flat belt. Accordingly, since the wire harness is flat, the wire harness is spaced away from the body panel surface as much as possible. Hence, this wire structure prevents the wire harness from being broken by the contact of the wire harness with the body panel.

Still further, according to the present invention, the wire harness is set meanderingly or zigzag on the mounting surface of the interior material. Accordingly, as the interior material expands or contracts, the wire harness laid zigzag is stretched and compressed, which prevents the wire harness from being broken.

Still further, according to the present invention, the protective member is water-proof. Therefore, it is unnecessary to interpose a water-proof sheet between the body panel and the interior material. This contributes to a simplification of the vehicle structure.

DETAILED DESCRIPTION OF PREFERRED EMBODIMENTS

Examples of a wiring structure in a vehicle, embodiments of the invention, will be described with reference to the accompanying drawings.

Figure 1:
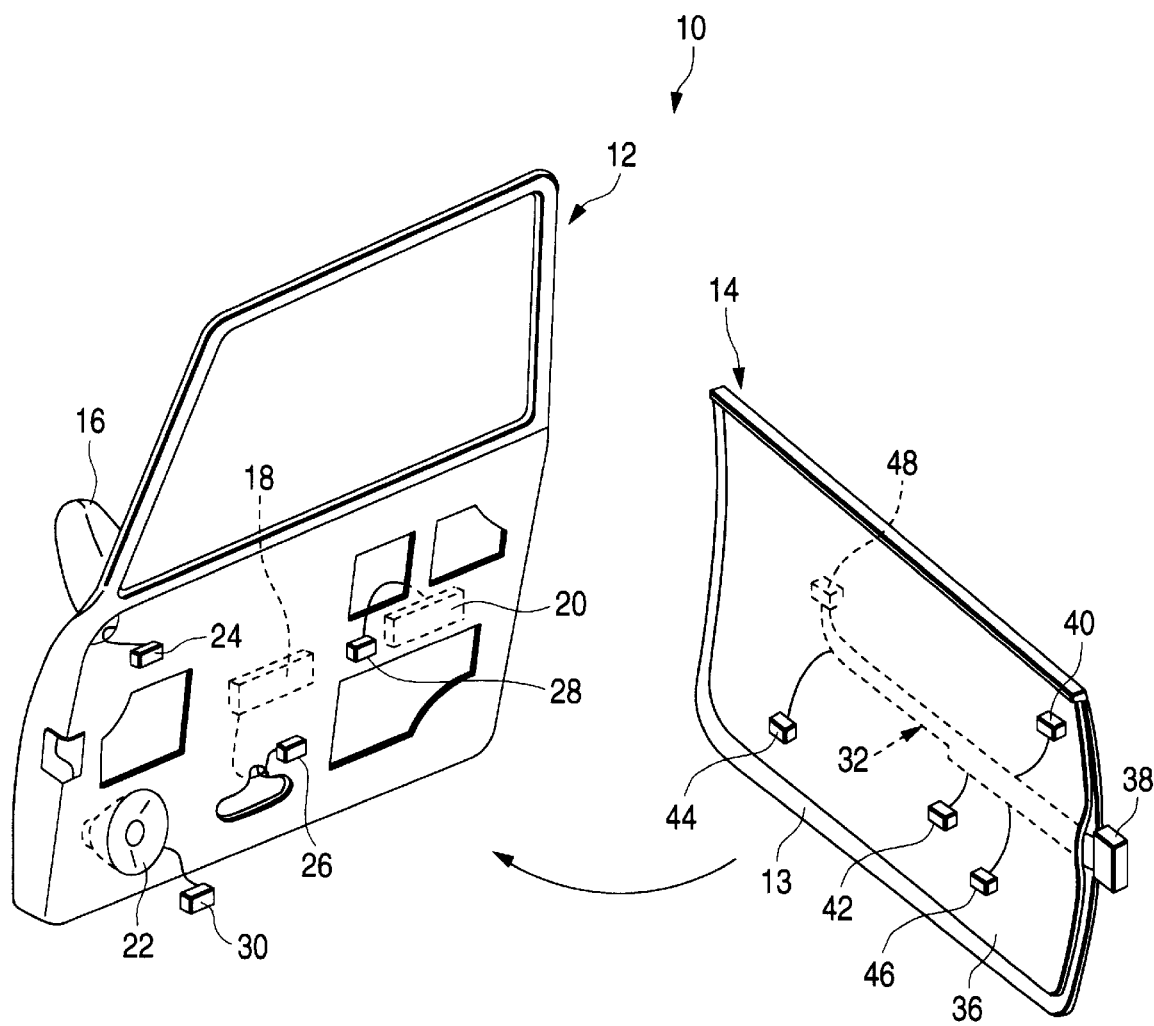
FIG. 1 is an exploded perspective view showing a front door to which a wiring structure according to the invention is applied.

FIG. 1 shows an example of a front door to which the wiring structure of the invention is applied. As shown in FIG. 1, the front door 10 comprises: a door panel 12, and a door trim 14 which is mounted on the vehicle room side of the door panel 12.

On the door panel 12, electrical components such as an electric door mirror 16, a window regulator 18, a door lock device 20, and a loud speaker 22 are assembled, and the connectors 24, 26, 28 and 30 of those electrical components are extended to the vehicle room side of the door panel 12.

On the other hand, the door trim 14 is integral with a wire harness 32 provided for the above-described electrical components such as the door lock device.

More specifically, a mounting surface 13 of the door trim 14, through which the interior material is combined with the body panel, has a recess 34 (FIG. 2) which forms a wire arranging path (passageway) of the wire harness 32. Along this recess 34, the wire harness 32 is bonded to the door trim 14. Under this condition, a cushion member 36 (or a protective member), which is, for instance, made of foamed urethane resin, is bonded to the entire mounting surface 13 of the door trim 14.

Figure 2:
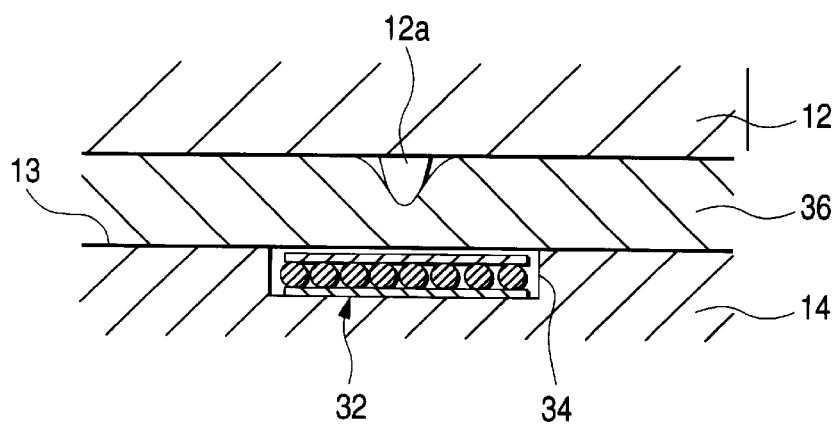
FIG. 2 is a sectional view showing the wiring structure of the aforementioned front door.
Figure 3:
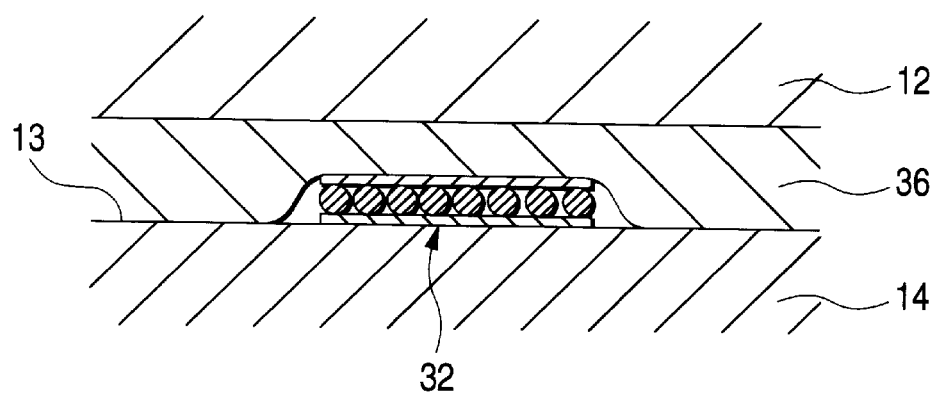
FIG. 3 is a sectional view showing another example of the wiring structure of the front door.

The wire harness 32, as shown in FIG. 2, is made up of a flat cable. The depth of the aforementioned recess 34 is such that, when the wire harness 32 is set in the recess 34, the outer surface of the wire harness 32 is substantially flush with the inner surface of the door trim body.

One end of the wire harness 32 is connected to a connector 38, which is connected to a main harness (not shown) which is to be connected, for instance, to a controller in the vehicle body. The other end of the wire harness 32 is connected to connectors 40, 42, 44 and 46, which are connected to the connectors 24, 26, 28 and 30 of the electric door mirror 16, the window regulator 18, the door lock device 20, and the loudspeaker 22. Those connectors 40, 42, 44, and 46 are led out of openings formed in the aforementioned cushion member 36 at the positions which corresponding to the positions of the mating connectors, so that they are connected to the mating connectors. A switching unit (not shown) for the window regulator 18 and the door lock device 20 is provided in the door trim 14 on the vehicle room side. The switching unit is connected to a connector 48 which is connected to the aforementioned wire harness 32.

With the front door 10 thus constructed, the connectors 40, 42, 44 and 46 of the wire harness 32 are connected to the connectors 24, 26, 28 and 30 of the electrical components, and thereafter the door trim 14 is combined with the door panel 12. Thus, the wire harness 32 has been installed on the front door 10. Hence, when compared with the conventional front door of this type in which the wire harness is installed on the door panel while being passed through hollow portions, and the connectors are engaged with one another, and thereafter the trim is combined with the door panel, the front door of the invention is advantageous in that the installation of the wire harness can be achieved considerably readily.

The cushion member 36 is bonded to the mounting surface 13 of the door trim 14. That is, the wire harness 32 is covered with the cushion member 36. Hence, although the wire harness 32 is provided integral with the surface of the door trim 14, as shown in FIG. 2, the wire harness 32 will never touch the surface of the door panel 12. Therefore, the front door 10 according to the invention is free from the difficulties that the wire harness is broken because it touches the door panel 12, or short-circuited because its cover is broken for the same reason.

In the arrangement of the door trim 14, the wire harness 32 is made up of a flat cable, and the wire harness is set in the recess 34 formed in the door trim 14. Therefore, as shown in FIG. 2, even if in the case where a protrusion 12a is formed on the surface of the door panel 12, for instance, by welding, the protrusion 12a will never damage the wire harness.

The above-described front door 10 is an example of the front door to which the wiring structure according to the invention is applied. Hence, it will be obvious to those skilled in the art that various changes and modifications may be made therein without departing from the invention.

For instance, in the above-described door trim 14, the recess 34 is formed in it, and the wire harness 32 is set in the recess 34 thus formed. However, the wire harness 32 may be installed on the door trim 14 without formation of the recess 34. In the case where the aforementioned protrusion 12a is necessarily formed on the door panel 12, it is preferable that the depth of the recess is determined with the protrusion 12a taken into consideration.

Figure 4:
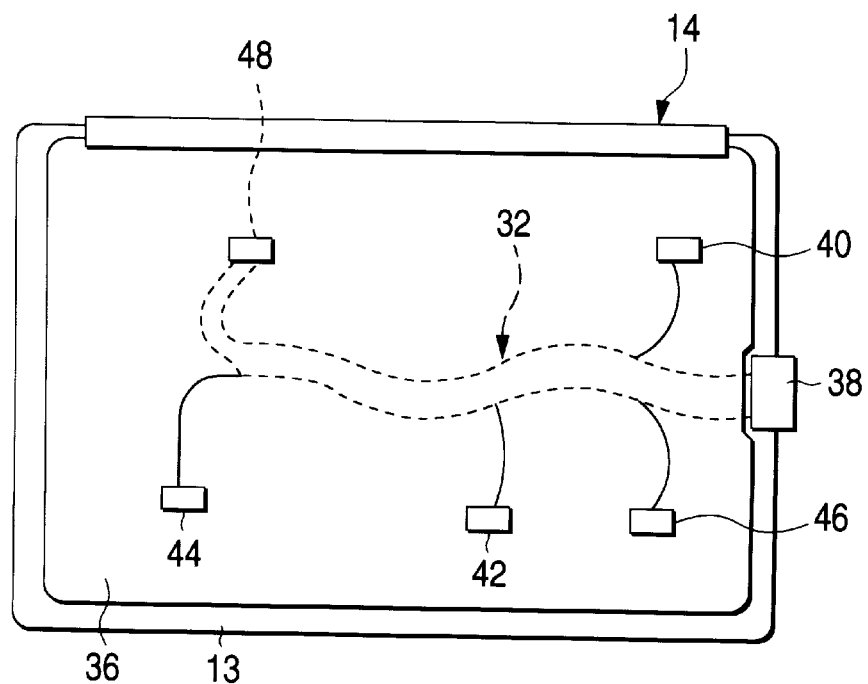
FIG. 4 is a plan view of a door trim in another example of the wiring structure of the front door.

In the door trim 14 shown in FIG. 1, the wire harness 32 is laid straightly. However, as shown in FIG. 4, the wire harness may be laid meander or zigzag so that it is stretched or compressed according to the expansion or contraction of the door trim 14. In general, the door trim made of resin or the like is larger in the coefficient of expansion than wires forming the wire harness 32. Therefore, if the wire harness 32 is fixedly secured to the door trim 14, then it may be broken because of the thermal expansion of the door trim 14. In order to overcome this difficulty, the wire harness is installed meanderingly or zigzag; that is, by installing the wire harness meanderingly or zigzag on the door trim, the difficulty is effectively eliminated that the wire harness 32 is broken for instance because of the expansion of the door trim 14.

In the above-described door trim 14, the wire harness 32 is made up of a flat cable; however, it is not always necessary that the wire harness 32 is a flat cable. For instance, the wire harness 32 may be formed like a circuit by automatically laying lines. The wire harness may be an ordinary one which is a bundle of wires. In this case, the wire harness should be held as flat as possible when installed on the door trim 14.

In the above-described door trim 14, the cushion member 36 is made of an urethane foamed resin material which has a water-proof property. However, the cushion member 36 may be made of a usual sponge material which does not have a water-proofness. In this case, the a water-proof sheet such as an ordinary "Nylon" sheet is bonded to the sponge material. However, it is preferable that, as in the case of the embodiment, the water-proof cushion member 36 is employed. In this case, it is unnecessary to use the water-proof sheet, and therefore the door structure is simplified as much; that is, the time and labor required for assembling the door are decreased so.

In the above-described front door 10, the connectors of the electrical components are connected to the connectors of the wire harness 32, and then the door trim 14 is combined with the door panel 12. However, the front door 10 may be modified as follows: The connectors of the electrical components are fixedly mounted on the door panel 12, while the connectors of the wire harness 32 are fixedly mounted on the door trim 14, in such a manner that the connectors on the door panel 12 are coincident in position with those on the door trim, so that the former connectors are automatically connected to the latter connector when the door trim is combined with the door panel. This modification further simplifies the front door assembling work.

As was described above, in the wiring structure, the wiring harness is set in the interior material, and the interior material is combined with the body panel to lay in the vehicle. Furthermore, the wire harness is fixedly laid on the mounting surface of the interior material, and the resilient protective member is laid on the wire harness, so that the wire harness will never be brought into contact with the body panel. Therefore, the difficulty is effectively eliminated that the contact of the wire harness with the body panel breaks the wire harness.

In the wire structure, the recess is formed in the mounting surface of the interior material through which the interior material is combined with the body panel, and the wiring harness is fixedly set in the recess thus formed, and the wire harness is formed like a flat belt. In this case, the wire harness is further spaced away from the body panel surface. Therefore, the contact of the body panel with the wire harness is more effectively prevented.

Furthermore, in the wiring structure, the wire harness is set zigzag on the mounting surface of the interior material. Hence, in the wiring structure, even if the interior material expands or contracts, the wire harness laid zigzag is prevented from being broken.

Moreover, in the wiring structure, the protective member is water-proof, which eliminates the use of the water-proof sheet which is normally interposed between the body panel and the interior material, which contributes to a simplification of the vehicle structure.

What is claimed is:

1. A wiring structure in a vehicle having a passenger compartment at least partially defined by an interior trim material mounted on a body panel of the vehicle, the wiring structure comprising:

a wire harness for electrical components, the wire harness being contained within a channel integrally formed in a mounting surface of the interior trim material, the interior trim material being combined with the body panel to arrange said wire harness in said vehicle; and a cushion member covering said wire harness and located between the interior trim material and the body panel;

wherein said wire harness has a length longer than a length of said channel and is set meanderingly or zigzag within said channel such that the wire harness expands or contracts without stress in accordance with expansion or contraction of said interior trim material.

2. A wiring structure as claimed in claim 1, wherein the channel is formed in the mounting surface of said interior trim material along a wiring route, and said wire harness is fixedly set in said channel.

3. A wiring structure as claimed in claim 1, wherein said wire harness is in the form of a flat belt.

4. A wiring structure as claimed in claim 1, wherein the channel is formed in the mounting surface of said interior trim material along a wiring route, and said wire harness is in the form of a flat belt and is fixedly set in said channel.

5. A wiring structure as claimed in claim 1, wherein said cushion member is water-proof.

6. A wiring structure as claimed in claim 1, wherein said cushion member is made of foamed urethane resin.

7. A wiring structure as claimed in claim 1, wherein said cushion member has a thickness greater than a protrusion formed on the body panel.

8. A wiring structure as claimed in claim 7, wherein the protrusion is a by-product of a process used in manufacturing the body panel.

9. A wiring structure as claimed in claim 8, wherein the process is a welding process.

10. A wiring structure as claimed in claim 1, wherein said cushion member is adhered to the interior trim material.

* * * * *